(12) United States Patent
Mahapatra et al.

(10) Patent No.: US 11,520,073 B2
(45) Date of Patent: Dec. 6, 2022

(54) MULTIPLE SENSOR AGGREGATION

(71) Applicant: Analog Devices International Unlimited Company, Limerick (IE)

(72) Inventors: Rajesh Mahapatra, Bangalore (IN); Raka Singh, Bangalore (IN)

(73) Assignee: Analog Devices International Unlimited Company, Limerick (IE)

( * ) Notice: Subject to any disclaimer, the term of this patent is extended or adjusted under 35 U.S.C. 154(b) by 225 days.

(21) Appl. No.: 17/093,079

(22) Filed: Nov. 9, 2020

(65) Prior Publication Data

US 2022/0035067 A1 Feb. 3, 2022

(30) Foreign Application Priority Data

Jul. 31, 2020 (IN) .............................. 202041032865

(51) Int. Cl.
*G01V 8/10* (2006.01)
*G06V 10/22* (2022.01)

(52) U.S. Cl.
CPC .............. *G01V 8/10* (2013.01); *G06V 10/235* (2022.01)

(58) Field of Classification Search
None
See application file for complete search history.

(56) References Cited

U.S. PATENT DOCUMENTS

| | | |
|---|---|---|
| 6,215,399 B1 | 4/2001 | Shpater |
| 8,411,963 B2 | 4/2013 | Luff |
| 8,743,198 B2 | 6/2014 | Padmanabh et al. |
| 9,124,778 B1 | 9/2015 | Crabtree |
| 9,183,686 B2 | 11/2015 | Noone et al. |
| 9,292,736 B2 | 3/2016 | Srinivasan et al. |
| 10,009,579 B2 | 6/2018 | Wang et al. |
| 10,209,124 B2 | 2/2019 | Monaci et al. |
| 2013/0015355 A1* | 1/2013 | Noone ................. G08B 13/248 250/340 |
| 2014/0139633 A1* | 5/2014 | Wang ....................... H04N 7/18 348/46 |

(Continued)

FOREIGN PATENT DOCUMENTS

| | | |
|---|---|---|
| EP | 2459808 B1 | 11/2018 |
| EP | 3617933 A1 | 3/2020 |

(Continued)

OTHER PUBLICATIONS

Luetto, Simone, "People counting using detection networks and self calibrating cameras on edge computing", MS Thesis, Polytechnic University of Turin, IT, (Dec. 2019), 114 pgs.

(Continued)

*Primary Examiner* — Abhishek Sarma
(74) *Attorney, Agent, or Firm* — Schwegman Lundberg & Woessner, P.A.

(57) ABSTRACT

This disclosure describes techniques to count objects in an area. The techniques include operations comprising: receiving, from a first sensor, data that identifies a location of a first object in an area at a given point in time; receiving, from a second sensor, data that identifies a location of a second object in the area at the given point in time; and aggregating the data from the first sensor and the data from the second sensor to compute a count value indicating how many objects are present in the area at the given point in time.

24 Claims, 5 Drawing Sheets

(56) References Cited

U.S. PATENT DOCUMENTS

| | | |
|---|---|---|
| 2015/0294513 A1 | 10/2015 | Kim |
| 2017/0176964 A1 | 6/2017 | O'keeffe |
| 2018/0032799 A1 | 2/2018 | Marcheselli et al. |
| 2018/0195706 A1 | 7/2018 | Chemel et al. |
| 2018/0336420 A1 | 11/2018 | Pandharipande et al. |
| 2022/0044064 A1* | 2/2022 | Zhang .................. G06V 10/761 |

FOREIGN PATENT DOCUMENTS

| | | |
|---|---|---|
| WO | WO-2016016900 A1 | 2/2016 |
| WO | WO-2019076732 A1 | 4/2019 |

OTHER PUBLICATIONS

Wetzel, Johannes, et al., "Joint Probabilistic People Detection in Overlapping Depth Images", IEEE Access, 8,, (2020), 28349-28359.

* cited by examiner

400

410

RECEIVE, FROM A FIRST SENSOR, DATA THAT IDENTIFIES A LOCATION OF A FIRST OBJECT IN AN AREA AT A GIVEN POINT IN TIME

420

RECEIVE, FROM A SECOND SENSOR, DATA THAT IDENTIFIES A LOCATION OF A SECOND OBJECT IN THE AREA AT THE GIVEN POINT IN TIME, THE SECOND OBJECT BEING WITHIN A FIELD OF VIEW OF THE FIRST SENSOR AND THE SECOND SENSOR, WHEREIN THE FIRST SENSOR REFRAINS FROM TRANSMITTING DATA THAT IDENTIFIES THE SECOND OBJECT IN RESPONSE TO DETERMINING THAT THE SECOND OBJECT IS WITHIN THE FIELD OF VIEW OF THE SECOND SENSOR

430

AGGREGATE THE DATA FROM THE FIRST SENSOR AND THE DATA FROM THE SECOND SENSOR TO COMPUTE A COUNT VALUE INDICATING HOW MANY OBJECTS ARE PRESENT IN THE AREA AT THE GIVEN POINT IN TIME

*FIG. 4*

MULTIPLE SENSOR AGGREGATION

CROSS-REFERENCE TO RELATED APPLICATION

This application claims the benefit of priority to Indian Application No. 202041032865, filed with the India (IN) Patent Office on Jul. 31, 2020, which is incorporated herein by reference in its entirety.

FIELD OF THE DISCLOSURE

This document pertains generally, but not by way of limitation, to detecting objects using overhead cameras, and more particularly, to using multiple sensors to detect a person in a room.

BACKGROUND

People detection and counting in a room is an important task in many applications such as surveillance, building, and space management, etc. Normally, the sensor is installed at the center of the room, on the ceiling and looks downwards. This kind of installation limits the occlusion issues but introduces various other complications when attempting to detect people.

Overview

This disclosure describes, among other things, techniques to detect an object using multiple sensors.

In some embodiments, a system and method are described for detecting an object using multiple sensors. The system and method perform operations that include: receiving, from a first sensor, data that identifies a location of a first object in an area at a given point in time; receiving, from a second sensor, data that identifies a location of a second object in the area at the given point in time, the second object being within a field of view of the first sensor and the second sensor, wherein the first sensor refrains from transmitting data that identifies the second object in response to determining that the second object is within the field of view of the second sensor; and aggregating the data from the first sensor and the data from the second sensor to compute a count value indicating how many objects are present in the area at the given point in time.

In some implementations, the first sensor comprises a passive infrared (PIR) detector.

In some implementations, the area comprises a conference room.

In some implementations, the operations further comprise: defining a first overlay mask for the first sensor, wherein the first sensor is configured to exclude detecting objects in the area that are inside of the first overlay mask; and defining a second overlay mask for the second sensor, wherein the second sensor is configured to exclude detecting objects in the area that are inside of the second overlay mask. In some implementations, an overlap region includes a first portion of an area outside of the first overlay mask that overlaps a second portion of an area outside of the second overlay mask, and a region outside of the first overlay mask combined with a region outside of the second overlay mask comprises the area in its entirety.

In some implementations, the operations further comprise: determining that a given object is within the overlap region; computing a first percentage of the first portion of area outside of the first overlay mask covered by the given object; computing a second percentage of the second portion of the area outside of the second overlay mask covered by the given object; and detecting the given object using the first sensor instead of the second sensor in response to determining that the first percentage is greater than the second percentage.

In some implementations, the operations further comprise: determining that a given object is within the overlap region; and detecting the given object using the first sensor instead of the second sensor in response to determining that the first sensor is associated with a higher priority than the second sensor.

In some implementations, the operations further comprise: mapping, based on a first timestamp received from the first sensor, the location of the first object in the area at the given point in time to a first virtual location associated with a virtual sensor; mapping, based on a second timestamp received from the second sensor, the location of the second object in the area at the given point in time to a second virtual location associated with the virtual sensor; determining that the first timestamp is within a threshold amount of the second timestamp; determining that a distance between the first virtual location and the second virtual location is less than a threshold value; and excluding the first object or the second object from the count value in response to determining that the distance between the first virtual location and the second virtual location is less than the threshold value.

In some implementations, the virtual sensor is positioned at a center of the area, and the position of the virtual sensor is computed based on lens distortion and position information of the first and second sensors.

In some implementations, the first sensor is configured to provide the data that identifies the location of the first object in the area in response to determining that the object is outside of an overlay mask region of the area defined for the first sensor. In some implementations, the overlay mask region is generated automatically based on a height of the sensor relative to a floor of the area. In some implementations, the overlay mask is generated at a floor height and at a height of a table based on user input.

In some implementations, an overlap region is generated that represents an area of detection for the first and second sensors, the overlap region being generated based on lens distortion parameters associated with the first and second sensors. In some implementations, the data that identifies the location of the first object in the area comprises a number of objects detected by the first sensor and coordinates of the first object.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 4 is a flow diagram depicting example process for counting objects in an area using multiple sensors in accordance with various embodiments.

DETAILED DESCRIPTION

This disclosure describes, among other things, techniques to use multiple sensors, such as passive infrared (PIR) detectors for detecting and counting objects (such as humans) in an area, such as a conference room.

Typical systems capture images from multiple sensors and stitch the images together to count people in a room. For example, a count algorithm is run on the stitched image data to determine how many people are detected at a given location. While such systems generally work well, they fail to consider duplicate counts, such as in the case that the same object appears in more than one of the stitched images. Also, such systems oftentimes have various dead zones that miss counting people that are present but are not depicted in the images.

According to the disclosed embodiments, the disclosure describes a novel and resource efficient approach to use a cloud-based aggregator for counting objects, such as people, in an area based on information received from multiple sensors. The disclosed approach receives, from a first sensor, data that identifies a location of a first object in an area at a given point in time and receives, from a second sensor, data that identifies a location of a second object in the area at the given point in time. The disclosed approach aggregates the data from the first sensor and the data from the second sensor to compute a count value indicating how many objects are present in the area at the given point in time.

In some cases, to avoid double counting objects, the disclosed approach maps, based on a first timestamp received from the first sensor, the location of the first object in the area at the given point in time to a first virtual location associated with a virtual sensor and maps, based on a second timestamp received from the second sensor, the location of the second object in the area at the given point in time to a second virtual location associated with the virtual sensor. The disclosed approach determines that the first timestamp is within a threshold amount of the second timestamp and, in response, compares a distance between the first virtual location and the second virtual location. The disclosed approach determines that the distance between the first virtual location and the second virtual location is less than a threshold value and, in response, excludes the first object or the second object from the count value in response to determining that the distance between the first virtual location and the second virtual location is less than the threshold value.

Figure 1:
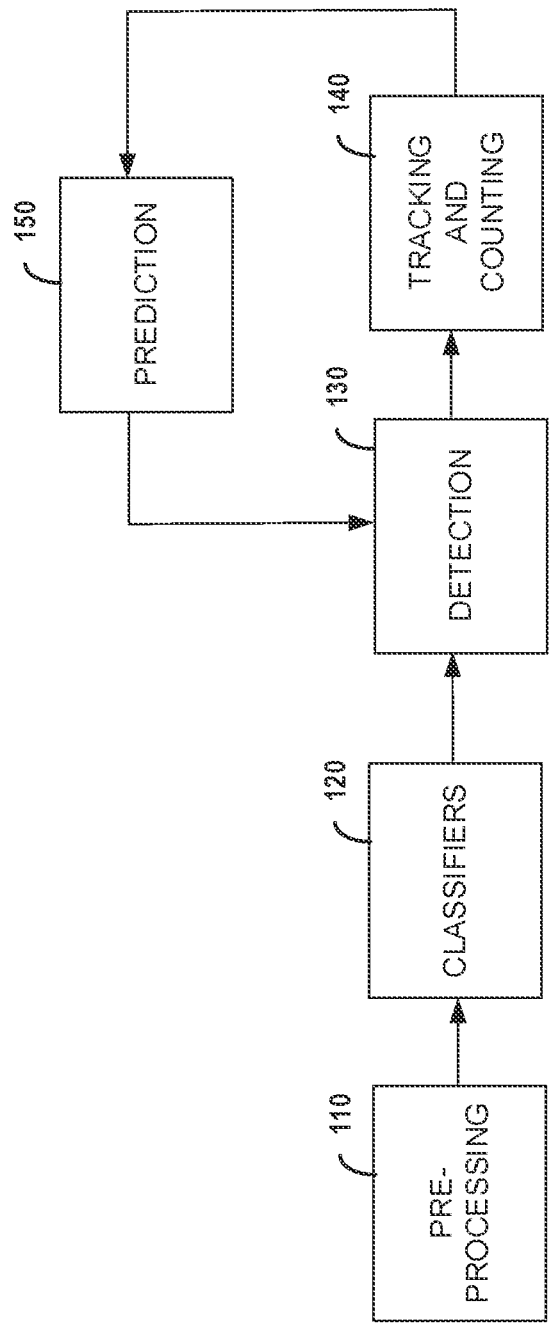
FIG. 1 is a block diagram of an example of an object detection system in accordance with various embodiments.

FIG. 1 is a block diagram of an example of an object detection system 100 in accordance with various embodiments. The object detection system 100 includes a pre-processing block 110, one or more classifiers 120, a detection block 130, a tracking and counting block 140, and a prediction block 150.

The object detection system 100 may count the number of people and their locations from a centrally mounted ceiling overhead sensor, such as a PIR sensor or camera (e.g., a fisheye lens or camera). In some cases, the object detection system 100 is configured to count and track human people as objects. In some other cases, the object detection system 100 is configured to count and track vehicles as objects. In such cases, the object detection system 100 (or the PIR sensor component of the object detection system 100) may be mounted overhead on a street sign above one or more car lanes. While the disclosed system is discussed with respect to tracking and counting human objects, the disclosed system can be applied to count and track any other type of object (cars, boats, planes, animals, and so forth).

Images captured by overhead cameras (that may or may not use fisheye lenses) are free from occlusion but also suffer from the problem that key features such as face, foot, hands of objects etc. are missing or cannot be seen. Also, relying only on motion features of the objects for detection and counting may not be reliable due to noise/light changes that may be interpreted as motion and incorrectly included in the counting/tracking. In some cases, multiple people in close proximity may not be detected separately and detecting and tracking people who make little motion may also be challenging.

The object detection system 100 receives at the pre-processing block 110 one or more images from an overhead sensor or camera, such as a fisheye lens. The one or more images may include multiple features, such as foreground, edges, motion, and occlusion features. The pre-processing block 110 extracts the features from the images. A first pre-processing engine in the pre-processing block 110 extracts motion features and occlusion features from the images. Occlusion features are defined as pixel-level features where occluding foreground pixels are extracted. A second pre-processing engine in the pre-processing block 110 extracts foreground pixels using a Mixture of Gaussian (MOG) algorithm and augments the foreground pixels with edge foreground pixels.

For example, the first pre-processing engine computes a motion map from consecutive frames received from the overhead sensor and generates a contrast change map to identify the areas of positive contrast change and negative contrast changes. The first pre-processing engine may use a passive infrared sensor (PIR) signal during changing lights to figure out the actual motion. The first pre-processing engine computes the occlusion map (or people in foreground) based on these contrast changes and forms occlusion (foreground) entities by segmenting the occlusion map. With help of motion map segmentation along with the occlusion entities, occupancy count entities are formed. These entities represent potential people or objects. The life of these occupancy count entities depends on motion in subsequent frames.

The second pre-processing engine runs the MOG model for background and foreground (BG/FG) classification or BG/FG map. Modeling the background and foreground avoids learning people sitting in room as background. This can be achieved with a selective learning of the background, with masks around people such that they are not learned as background. The output of the pre-processing block 110 produces a set of images 200 (FIG. 2) in which different regions are identified as regions-of-interest 210 and 220 that may or may not include a target object (e.g., a human or vehicle). For example, squares or other shapes of different sizes can be added by the pre-processing block 110 to the captured image to identify regions that may contain an object to be counted and/or tracked. In some embodiments, the output of the pre-processing block 110 is provided to HOG classifiers 120 to detect presence of objects in the identified regions, such as based on a position and orientation of the regions relative to the overhead camera or sensor.

In some embodiments, the occupancy count entities go through a filter where the camera geometry (human calibrated models) is used to find modelled shape of a person in an image at that point. The overlap of shape of person with occupancy count entity is done on the BG/FG map. If the shape criteria matches certain requirements, these occupancy count entities are added as new tracked objects.

In each and every iteration, tracked objects are matched with occupancy count entities in the tracking and counting block 140. In some embodiments, HOG classifiers which are trained on overhead people are run in the spatial vicinity of the tracked objects. These HOG classifiers are used to boost confidence of the detections. There is a feedback mechanism where a tracked object with HOG classifier increases life of its corresponding occupancy entity.

In a post-processing engine (the detection block 130), some of the tracked objects (output by the classifiers 120) are not counted based on their history of motion, BG/FG pixels, and/or number of classifier detection patterns. Specifically, the post processing engine uses features from a second pre-processing engine of the pre-processing block 110 to extract at a lower image resolution, confidence map and motion map. The confidence map shows the confidence probability of each pixel being a person. The motion map shows the regions where there are motion features.

The post-processing engine, such as the detection block 130, computes motion regions at two different resolution of motion features, 320×240 and 80×60, to get low resolution motion blobs and high resolution motion blobs. High resolution motion blobs detect people farther away from the center, because of the increased granularity at high resolution. The output of the post-processing engine feeds into an association-tracking block 140, which associates over time uniquely identified motion regions. These motion regions or blobs are detected as potential people. These motion regions are fed back into a tracking module which tracks people. In this way, people who stop making motion are still detected without motion features. The tracking module also does a prediction using the prediction block 150 of location for the subsequent frame, which is fed back into the detection block 130. This allows the detection block to remove false positives or identify false negatives in subsequent frames of a video.

In some embodiments, the output of tracking is fed into a classifier based on HOG-SVM, which detects people based on HOG features which are pre-trained to create the SVM model. The classifier model increases the confidence of the tracked areas as people. Hence, areas with no motion can still be detected as people, and areas with motion like shadows etc., can be rejected as people. The extracted features such as motion, confidence, foreground, classifier detections are used together in the post processing engine (detection block 130) to remove false positives and false negatives, and count the people.

In some embodiments, the object detection system 100 uses multiple PIR sensors to count the number of people in an area, such as a room. During a setup procedure, each PIR sensor is configured to detect objects within a certain region of the area. This region is defined as a portion outside of an overlay or exclusion mask. Namely, while the PIR sensor can capture and detect objects in a certain region, an overlay mask is defined to exclude the PIR sensor from detecting objects within a given portion of the region. In this way, multiple PIR sensors can work together to provide accurate coverage for an entire area. Specifically, a first overlay mask is defined for a first sensor and a second overlay mask is defined for a second sensor. The overlay masks prevent the first sensor from detecting objects within a particular region that the second sensor covers (e.g., a region that is not within the overlay mask of the second sensor). Similarly, the second sensor is prevented from detecting objects within a particular region that the first sensor covers (e.g., a region that is not within the overlay mask of the first sensor). In some cases, the first sensor may detect objects that are within a particular region covered by the second sensor. If such objects are within the overlay region defined for the first sensor, the first sensor may be prevented from transmitting an indication of the detected object to the object detection system 100. This ensures that that object detection system 100 does not double count objects that are detected and seen by both the first and the second sensors.

Figure 2:
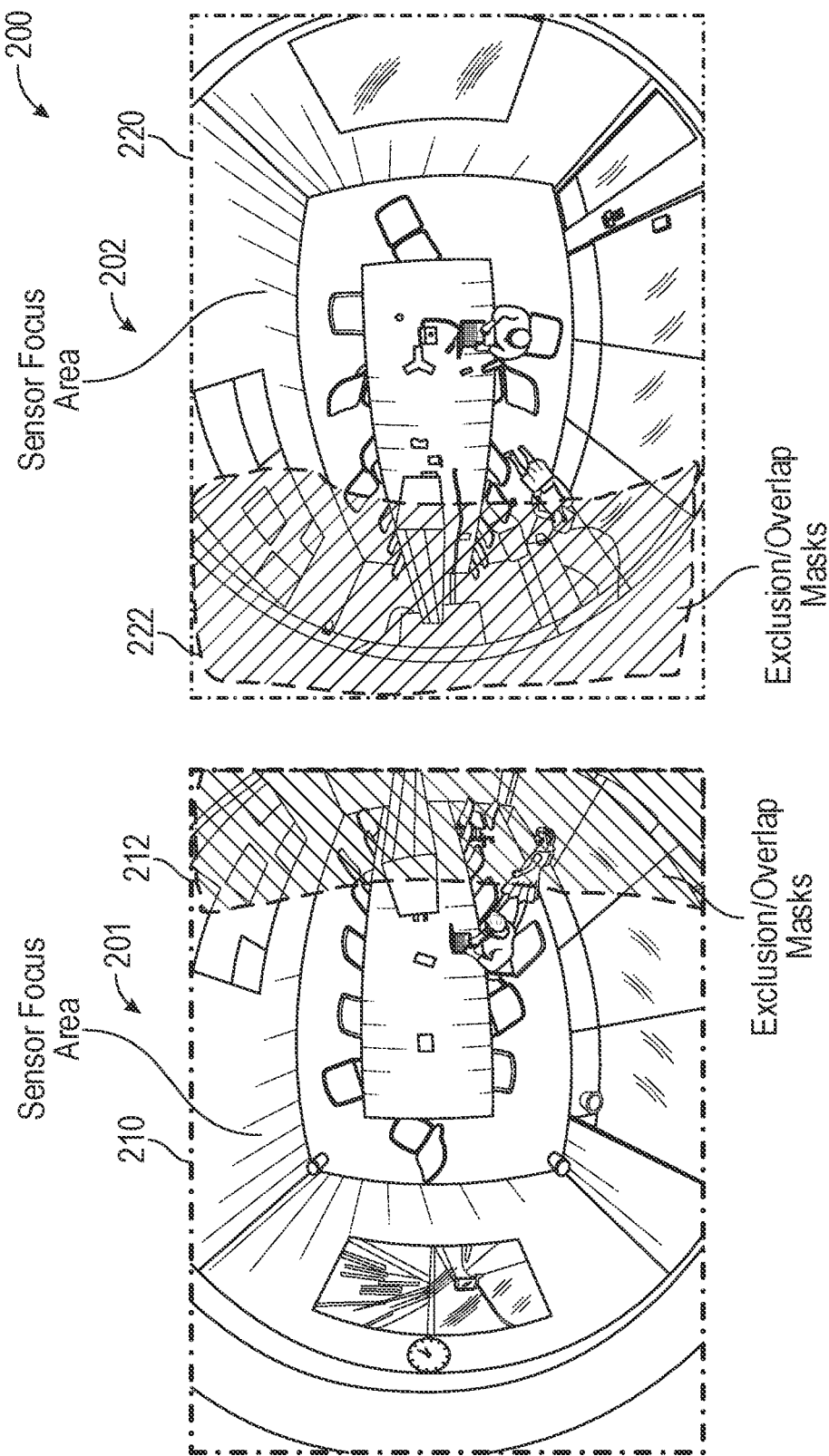
FIG. 2 is an example of images captured by overhead sensors in accordance with various embodiments.

FIG. 2 is an example of images 200 captured by two or more overhead sensors in accordance with various embodiments. Specifically, a first sensor captures a first image 201 of the images 200 and a second sensor captures a second image 202 of the images 200. The first sensor has a first overlay mask 212 defined which causes the first sensor to only detect (or only transmit indications of objects) and count objects that are outside of the first overlay mask 212. Namely, the first sensor is configured to detect and count objects within region 210. In some cases, the first sensor only transmits data to the object detection system 100 representing objects that are within the region 210 (outside of the first overlay mask 212).

The second sensor has a second overlay mask 222 defined which causes the second sensor to only detect (or only transmit indications of objects) and count objects that are outside of the second overlay mask 222. Namely, the second sensor is configured to detect and count objects within region 220. In some cases, the second sensor only transmits data to the object detection system 100 representing objects that are within the region 220 (outside of the second overlay mask 222). Together the region 210 and the region 220 cover the entire area of interest (e.g., the conference room). While only two sensor images and sensors are described, similar areas and overlay masks can be defined for larger areas that use more than two sensors, such as four sensors.

To define the overlay mask for a given set of sensors, a technician may place a visual marker (such as a red circle that is about 6 inches in radius or other physical object) underneath each sensor in the area. A display may be provided to the technician that shows a view from each of the sensors in the area. The technician may click on the visual marker that appears in each view of each sensor. In response, the object detection system 100 generates an overlay mask (exclusion region) and associates the overlay mask with each respective sensor. In some cases, the physical marker is placed on a table and the overlay mask is generated based on a default height of the table. If the physical marker is placed on the floor, the technician may specify that the marker is on the floor and a different overlay mask (larger or smaller in size) is generated. In some cases, the overlay mask is automatically generated based on lens distortion parameters associated with each of the sensors.

For example, the object detection system 100 may access parameters for a given sensor that is in the area. The parameters may indicate the height of the sensor from the floor and the lens distortion parameters of the sensor. The lens distortion parameters may indicate quality and resolution of a given object or image portion as a function of distance and height of the sensor. In one implementation, if the sensor is positioned at a first height, the lens distortion exceeds a specified threshold value starting from a first location that is at a first distance from the sensor position. Image portions of objects at the first location and further away from the sensor position may lack sufficient quality and resolution for accurate detection and counting of objects. If the sensor is positioned at a second height that is greater than the first height, the lens distortion is exceeds the specified threshold starting from a second location (closer than the first location) that is at a second distance (shorter than the first distance) from the sensor position. Image portions of objects at the second location and further away from the sensor position may lack sufficient quality and resolution for accurate detection and counting of objects when the sensor is at the second height.

The object detection system 100 may be configured to allow detection or transmission of data indicating presence of an object at a particular location for which the lens distortion is less than a specified threshold. Namely, if the quality and resolution of the image portion that depicts the object exceeds a specified threshold (e.g., the lens distortion at that location is less than the threshold), the reliability and accuracy of the detected object meets a minimum threshold. In this case, the object detection system 100 allows the portion that depicts the object as received and detected by the given sensor to be used to count the object. Locations of the image that have a lens distortion that is greater than the specified threshold may be excluded from detection by the given sensor (e.g., the given sensor may exclude transmitting indications of objects that are detected in such regions of the image). In this way, the object detection system 100 automatically draws or computes the overlay mask for the given sensor to represent areas of the image that are detectable by the given sensor with lens distortion that exceeds the specified threshold.

In some cases, a user can adjust the automatically computed and determined overlay mask for each sensor, such as by visually examining images received from the sensors including portions inside and outside of the automatically generated overlay mask. In some cases, the overlay mask is manually drawn and defined by the user for each sensor. For example, an image representing a view of the area from each sensor may be presented to the technician. The technician can then specify a geometrical shape on the image to define the overlay mask for each sensor. For example, a first image may be displayed representing a view from a first sensor and in response the technician can draw or mark the overlay mask for the first sensor on the first image. A second image may be displayed representing a view from a second sensor and in response the technician can draw or mark the overlay mask for the second sensor on the second image.

In some cases, a physical mark can be placed midway between the two sensors and the marker can be selected in the images presented to the user to automatically generate the overlay masks. For example, the object detection system 100 may compare the lens distortion of each image portion received from first and second sensors. The object detection system 100 draws the overlay masks based on the lens distortion of each of the first and second sensors that is lower in value relative to the specified threshold. For example, the first sensor may be determined to have a first lens distortion for a first image portion and a second sensor may be determined to have a second lens distortion for the same first image portion. If the first lens distortion is lower than the second lens distortion, the object detection system 100 may include the first image portion in the overlay mask associated with the second sensor and exclude the first image portion from the overlay mask associated with the first sensor. In some cases, the first image portion may be in an overlap region (e.g., a region that is outside of the overlay masks of the first and second sensors) of the first and second sensors. In such circumstances, the object detection system 100 may assign a higher priority to the first sensor than the second sensor for objects detected by both sensors in the first image portion (e.g., if the lens distortion of the first sensor is lower than the lens distortion of the second sensor for the position associated with the first image portion). In this way, if an object is detected by the first and second sensors in the overlap region, only the sensor with the higher priority transmits the indication of the object to the object detection system 100 for counting and tracking. The priority values associated with each sensor may vary based on the lens distortion of each sensor (e.g., based on distance and/or height of the image portions detected by each sensor). As an example, for a first image portion (e.g., a first position in the area that is within view of two sensors), a first sensor may be assigned a first priority value that is greater than a second priority value associated with a second sensor. For a second image portion (e.g., a second position in the area that is within view of two sensors), the second sensor may be assigned the first priority value and the first sensor may be assigned the lower second priority value.

In some cases, a floorplan representing a location of the sensors may be generated. Based on the floorplan, the object detection system 100 generates the overlay masks for each sensor. For example, the floorplan may be presented to the technician and the technician may specify a rectangular area for each sensor to focus on. In some cases, the user can specify the dimension of the room, length, width and height of the room. The object detection system 100 uses the dimensions of the room to compute the lens distortion parameters of each sensor and/or to compute the overlay masks, overlap regions, and priorities of each sensor.

For example, a portion of the first overlay mask 212 may overlap with a portion of the second overlay mask 222. In some cases, if a portion of an object is present in this overlap area (e.g., the object is partially detectable by both the first and second sensors), the object detection system 100 determines what percentage of the object appears in the region 210 relative to the percentage of the object that appears in the region 220. If a greater percentage of the object appears in the region 210 than that which appears in the region 220, the object detection system 100 excludes information about the object received from the second sensor and only considers the object to be present and detected by the first sensor. In some cases, the object detection system 100 determine whether to count the object as being present or not based on the percentage of the object that appears in the region 210 relative to the percentage of the object that appears in the region 220 in addition to the priority values of the first and second sensors. As an example, a greater percentage of the object may appear in the region 210 (associated with the first sensor) than the region 220 (associated with the second sensor). The object detection system 100 may determine that the second sensor is associated with a greater priority value for that particular portion of the image. In response, even though a greater percentage of the object appears in the region 210 associated with the first sensor, the object detection system 100 may exclude the information received from the first sensor about the object and only consider the information received from the second sensor to count the object (e.g., because the second sensor is associated with a greater priority value than the first sensor for the region in which the object is detected).

In some cases, a portion of the region 210 overlaps a portion of the region 220. If an object is present in this overlap area (e.g., the object is detectable and counted by both the first and second sensors), the object detection system 100 determines what percentage of the object appears in the region 210 relative to the percentage of the object that appears in the region 220. If a greater percentage of the object appears in the region 210 than that which appears in the region 220, the object detection system 100 excludes information about the object received from the second sensor and only considers the object to be present and detected by the first sensor. In some other cases, if an object is present in this overlap area (e.g., the object is detectable and counted by both the first and second sensors), the object detection system 100 determines priority values associated with the first and second sensor. If the second sensor is of greater priority than the first sensor (e.g., because the second sensor is on the left or on the top and the first sensor is on the right or on the bottom), the object detection system 100 excludes information about the object received from the first sensor and only considers the object to be present and detected by the second sensor.

In one embodiment, each sensor is configured to generate a count of the number of objects or people the sensor detects, a timestamp at which time the objects or people are detected and a relative location of the objects or people in the area relative to the sensor. Each sensor is configured to transmit the information (object locations or count values of objects) or data it collects for the objects that are detected outside of the overlay region associated with the respective sensors over the Internet to a centralized aggregator. The centralized aggregator can be included in the object detection system 100 on the cloud.

Figure 3:
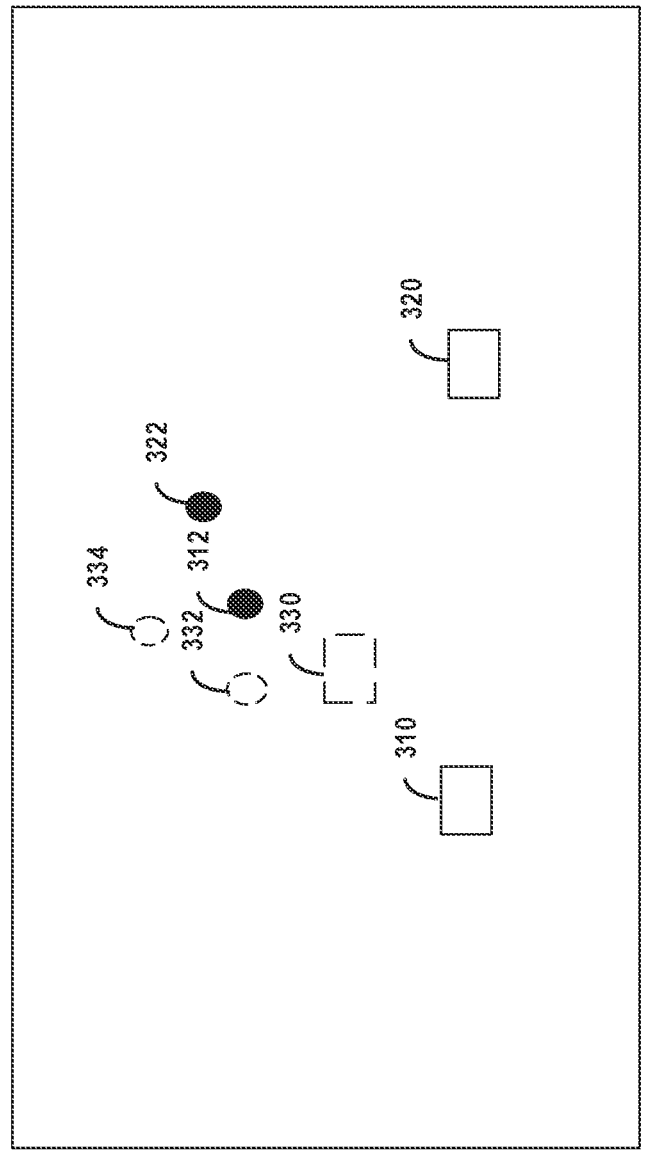
FIG. 3 is a block diagram of virtual sensor object locations in accordance with various embodiments.

FIG. 3 is a block diagram 300 of virtual sensor object locations in accordance with various embodiments. For example, the object detection system 100 may receive data identifying locations of objects in an area from multiple sensors and may apply a technique to avoid double counting certain objects. Specifically, if the same object is detected by more than one sensor (e.g., if the object is in an overlap region of two sensors or if a portion of the object is in a detection region (outside of the overlay mask) of one sensor and another portion of the object is in a detection region (outside of the overlay mask) of another sensor), the object detection system 100 may only count the object once rather than twice. To determine whether the same physical object is being reported by the sensors as two separate objects (one object from each sensor), the object detection system 100 may map the locations of the object reported by each sensor to a common virtual sensor. The object detection system 100 then determines whether the locations of the object mapped to the virtual sensor are within a threshold distance of each other to determine whether the objects correspond to the same physical object.

Specifically, each sensor provides coordinates of the objects the sensor detects as well as timestamps at which the objects were detected (e.g., in an area outside of the overlay mask of the respective sensors). For example, a first sensor 310 may detect and report (e.g., transmit over the Internet to the cloud aggregator in the object detection system 100) a first object 312 and associate a first timestamp with the first object 312. A second sensor 320 may detect and report (e.g., transmit over the Internet to the cloud aggregator in the object detection system 100) a second object 322 and associate a second timestamp with the second object 322. The first and second objects 312 and 322 may actually correspond to the same person that appears in an overlap region of the first and second sensors 310 and 320.

The object detection system 100 may receive the data identifying the first and second objects 312 and 322 from the sensors 310 and 320. The object detection system 100 may determine whether the first timestamp is within a threshold amount of the second timestamp (e.g., whether the first timestamp is within 2 minutes or 2 seconds of the second timestamp). In response to determining that the first timestamp is within the threshold amount of the second timestamp, the object detection system 100 may compute a first virtual location 332 of the first object 312 relative to a virtual sensor 330 and a second virtual location 334 of the second object 322. If the first timestamp is greater than the threshold amount of the second timestamp, the object detection system 100 may consider both the first object 312 and the second object 322 as separate objects in an aggregated count value of objects in the area and continue tracking the two objects separately.

Specifically, the object detection system 100 may compute a location of a virtual sensor 330 in the area based on lens distortion parameters of the first and second sensors 310 and 320 and based on their respective positions. The 2D object location is converted to a 3D location (of the virtual sensor 330) using projection 2D to 3D methods. The projection 2D to 3D methods comprises the following steps based on f-theta of lens.

$r = \text{sqrt}(x*x + y*y)$ $\text{theta} = r/f$ $r\_n = f*\tan(\text{theta})$ $x\_n = x*r\_n/r$ $y\_n = y*r\_n/r$ $X = H*x\_n/f$ $Y = H*y\_n/f$ $Z = H$ (x,y) is the 2D location of the object and (X,Y,Z) is the 3D location of the object on an assumed plane at a height H from the sensor.

The object detection system 100 may compute a second virtual location 334 of the second object 322 relative to the virtual sensor 330. In this way, the object detection system 100 maps the two actual coordinates received from the two different sensors to a common coordinate system. The object detection system 100 computes a difference between the first and second virtual locations 332 and 334. In response to determining that the difference is less than a threshold value (e.g., less than 2 meters), the object detection system 100 determines that the first and second objects 312 and 322 correspond to the same physical object and only includes one of the objects 312 and 322 in an aggregated count value of the number of objects in the area. For example, the object detection system 100 only considers the data identifying the first object 312 in the aggregated count value and excludes the data identifying the second object 322 from the aggregated count value.

FIG. 4 is a flow diagram depicting example process 400 for detecting an object in an image captured by an overhead camera in accordance with various embodiments. The operations of the process 400 may be performed in parallel or in a different sequence, or may be entirely omitted. In some embodiments, some or all of the operations of the process 400 may be embodied on a computer-readable medium and executed by one or more processors.

At operation 410, the object detection system 100 receives, from a first sensor, data that identifies a location of a first object in an area at a given point in time.

At operation 420, the object detection system 100 receives, from a second sensor, data that identifies a location of a second object in the area at the given point in time, the second object being within a field of view of the first sensor and the second sensor, wherein the first sensor refrains from transmitting data that identifies the second object in response to determining that the second object is within the field of view of the second sensor.

At operation 430, the object detection system 100 aggregates the data from the first sensor and the data from the second sensor to compute a count value indicating how many objects are present in the area at the given point in time.

Figure 5:
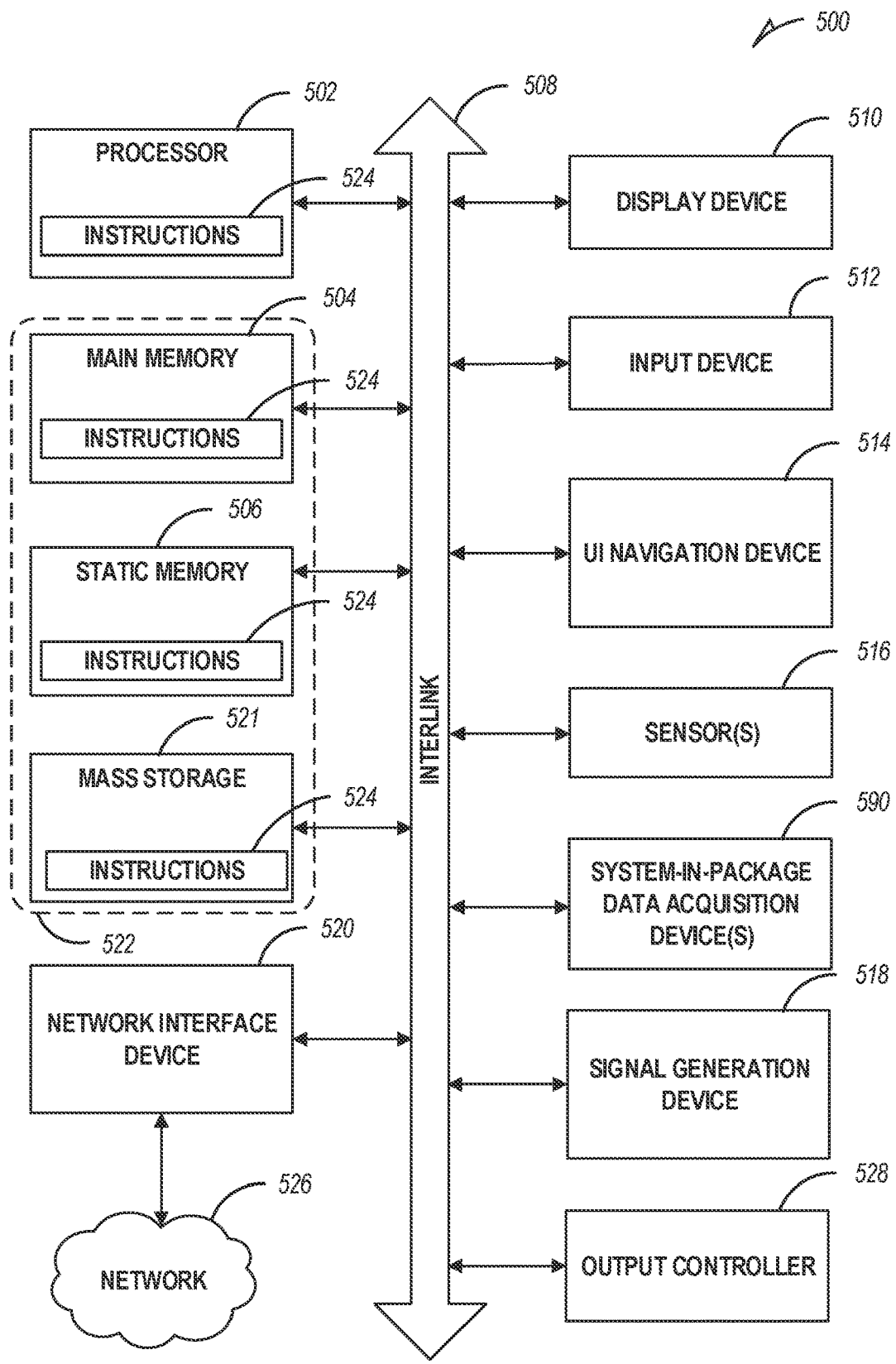
FIG. 5 is a block diagram illustrating an example of a machine upon which one or more embodiments may be implemented.

FIG. 5 is a block diagram of an example machine 500 upon which any one or more of the techniques (e.g., methodologies) discussed herein may be performed. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in a peer-to-peer (P2P) (or other distributed) network environment. The machine 500 may be a personal computer (PC), a tablet PC, a set-top box (STB), a personal digital assistant (PDA), a mobile telephone, a web appliance, an IoT device, an automotive system, an aerospace system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant-massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 500 may include a hardware processor 502 (e.g., a central processing unit (CPU), a graphics processing unit (GPU), a hardware processor core, or any combination thereof, such as a memory controller, etc.), a main memory 504, and a static memory 506, some or all of which may communicate with each other via an interlink (e.g., bus) 508. The machine 500 may further include a display device 510, an alphanumeric input device 512 (e.g., a keyboard), and a user interface (UI) navigation device 514 (e.g., a mouse). In an example, the display device 510, alphanumeric input device 512, and UI navigation device 514 may be a touchscreen display. The machine 500 may additionally include a storage device 522 (e.g., drive unit); a signal generation device 518 (e.g., a speaker); a network interface device 520; one or more sensors 516, such as a Global Positioning System (GPS) sensor, wing sensors, mechanical device sensors, temperature sensors, ICP sensors, bridge sensors, audio sensors, industrial sensors, a compass, an accelerometer, or other sensors; and one or more system-in-package data acquisition devices 590. The machine 500 may include an output controller 528, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The storage device 522 may include a machine-readable medium on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 521 may constitute the machine-readable medium.

While the machine-readable medium is illustrated as a single medium, the term "machine-readable medium" may include a single medium or multiple media (e.g., a centralized or distributed database, or associated caches and servers) configured to store the one or more instructions 524.

The term "machine-readable medium" may include any transitory or non-transitory medium that is capable of storing, encoding, or carrying transitory or non-transitory instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories, and optical and magnetic media. In an example, a massed machine-readable medium comprises a machine-readable medium with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 (e.g., software, programs, an operating system (OS), etc.) or other data that are stored on the storage device 521 can be accessed by the main memory 504 for use by the hardware processor 502. The main memory 504 (e.g., DRAM) is typically fast, but volatile, and thus a different type of storage from the storage device 521 (e.g., an SSD), which is suitable for long-term storage, including while in an "off" condition. The instructions 524 or data in use by a user or the machine 500 are typically loaded in the main memory 504 for use by the hardware processor 502. When the main memory 504 is full, virtual space from the storage device 521 can be allocated to supplement the main memory 504; however, because the storage device 521 is typically slower than the main memory 504, and write speeds are typically at least twice as slow as read speeds, use of virtual memory can greatly reduce user experience due to storage device latency (in contrast to the main memory 504, e.g., DRAM). Further, use of the storage device 521 for virtual memory can greatly reduce the usable lifespan of the storage device 521.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks), among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any tangible or intangible medium that is capable of storing, encoding, or carrying instructions for execution by the machine 500, and includes digital or analog communications signals or other tangible or intangible media to facilitate communication of such software.

Each of the non-limiting aspects or examples described herein may stand on its own, or may be combined in various permutations or combinations with one or more of the other examples.

The above detailed description includes references to the accompanying drawings, which form a part of the detailed description. The drawings show, by way of illustration, specific embodiments in which the inventive subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended; that is, a system, device, article, composition, formulation, or process that includes elements in addition to those listed after such a term in a claim are still deemed to fall within the scope of that claim. Moreover, in the following claims, the terms "first," "second," "third," etc. are used merely as labels, and are not intended to impose numerical requirements on their objects.

Method examples described herein may be machine- or computer-implemented at least in part. Some examples may include a computer-readable medium or machine-readable medium encoded with transitory or non-transitory instructions operable to configure an electronic device to perform methods as described in the above examples. An implementation of such methods may include code, such as microcode, assembly-language code, a higher-level-language code, or the like. Such code may include transitory or non-transitory computer-readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read-only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the detailed description as examples or embodiments, with each claim standing on its own as a separate embodiment, and it is contemplated that such embodiments may be combined with each other in various combinations or permutations. The scope of the inventive subject matter should be determined with reference to the appended claims, along with the full scope of equivalents to which such claims are entitled.

The invention claimed is:

1. A system for detecting an object using multiple sensors, the system comprising:
a processor; and
a memory for storing one or more instructions that, when executed by the processor, configure the processor to perform operations comprising:
receiving, from a first sensor, data that identifies a location of a first object in an area at a given point in time;
receiving, from a second sensor, data that identifies a location of a second object in the area at the given point in time, the second object being within a field of view of the first sensor and the second sensor, wherein the first sensor refrains from transmitting data that identifies the second object in response to determining that the second object is within the field of view of the second sensor; and
aggregating the data from the first sensor and the data from the second sensor to compute a count value indicating how many objects are present in the area at the given point in time.

2. The system of claim 1, wherein the first sensor comprises a passive infrared (PIR) detector, and wherein the operations further comprise:
defining a first overlay a mask which will exclude an area under the first sensor from detecting objects in that area;
defining a second overlay a mask which will exclude an area under the second sensor from detecting objects in that area, the first and second overlay masks of the first and second sensor being mutually exclusive.

3. The system of claim 1, wherein the area comprises a conference room.

4. The system of claim 1, wherein the operations further comprise:
defining a first overlay mask for the first sensor, wherein the first sensor is configured to exclude detecting objects in the area that are inside of the first overlay mask; and
defining a second overlay mask for the second sensor, wherein the second sensor is configured to exclude detecting objects in the area that are inside of the second overlay mask.

5. The system of claim 4, wherein an overlap region includes a first portion of an area outside of the first overlay mask that overlaps a second portion of an area outside of the second overlay mask, and wherein a region outside of the first overlay mask combined with a region outside of the second overlay mask comprises the area in its entirety.

6. The system of claim 5, wherein the operations further comprise:
determining that a given object is within the overlap region;
computing a first percentage of the first portion of area outside of the first overlay mask covered by the given object;
computing a second percentage of the second portion of the area outside of the second overlay mask covered by the given object; and
detecting the given object using the first sensor instead of the second sensor in response to determining that the first percentage is greater than the second percentage.

7. The system of claim 5, wherein the operations further comprise:
determining that a given object is within the overlap region; and
detecting the given object using the first sensor instead of the second sensor in response to determining that the first sensor is associated with a higher priority than the second sensor.

8. The system of claim 1, wherein the operations further comprise:
mapping, based on a first timestamp received from the first sensor, the location of the first object in the area at the given point in time to a first virtual location associated with a virtual sensor;
mapping, based on a second timestamp received from the second sensor, the location of the second object in the area at the given point in time to a second virtual location associated with the virtual sensor;
determining that the first timestamp is within a threshold amount of the second timestamp;
determining that a distance between the first virtual location and the second virtual location is less than a threshold value; and
excluding the first object or the second object from the count value in response to determining that the distance between the first virtual location and the second virtual location is less than the threshold value.

9. The system of claim 8, wherein the virtual sensor is positioned at a center of the area, and wherein the position of the virtual sensor is computed based on lens distortion and position information of the first and second sensors.

10. The system of claim 1, wherein the first sensor is configured to provide the data that identifies the location of the first object in the area in response to determining that the object is outside of an overlay mask region of the area defined for the first sensor.

11. The system of claim 10, wherein the overlay mask region is generated automatically based on a height of the sensor relative to a floor of the area.

12. The system of claim 10, wherein the overlay mask is generated at a floor height and at a height of a table based on user input.

13. The system of claim 1, wherein an overlap region is generated that represents an area of detection for the first and second sensors, the overlap region being generated based on lens distortion parameters associated with the first and second sensors.

14. The system of claim 1, wherein the data that identifies the location of the first object in the area comprises a number of objects detected by the first sensor and coordinates of the first object.

15. A method comprising:
receiving, from a first sensor, data that identifies a location of a first object in an area at a given point in time;
receiving, from a second sensor, data that identifies a location of a second object in the area at the given point in time, the second object being within a field of view of the first sensor and the second sensor, wherein the first sensor refrains from transmitting data that identifies the second object in response to determining that the second object is within the field of view of the second sensor; and
aggregating the data from the first sensor and the data from the second sensor to compute a count value indicating how many objects are present in the area at the given point in time.

16. The method of claim 15, wherein the first sensor comprises a passive infrared (PIR) detector.

17. The method of claim 15, wherein the area comprises a conference room.

18. The method of claim 15, further comprising:
defining a first overlay mask for the first sensor, wherein the first sensor is configured to exclude detecting objects in the area that are inside of the first overlay mask; and
defining a second overlay mask for the second sensor, wherein the second sensor is configured to exclude detecting objects in the area that are inside of the second overlay mask.

19. The method of claim 15, further comprising:
mapping, based on a first timestamp received from the first sensor, the location of the first object in the area at the given point in time to a first virtual location associated with a virtual sensor;
mapping, based on a second timestamp received from the second sensor, the location of the second object in the area at the given point in time to a second virtual location associated with the virtual sensor;
determining that the first timestamp is within a threshold amount of the second timestamp;
determining that a distance between the first virtual location and the second virtual location is less than a threshold value; and
excluding the first object or the second object from the count value in response to determining that the distance between the first virtual location and the second virtual location is less than the threshold value.

20. An apparatus comprising:
means for receiving, from a first sensor, data that identifies a location of a first object in an area at a given point in time;
means for receiving, from a second sensor, data that identifies a location of a second object in the area at the given point in time, the second object being within a field of view of the first sensor and the second sensor, wherein the first sensor refrains from transmitting data that identifies the second object in response to determining that the second object is within the field of view of the second sensor; and
means for aggregating the data from the first sensor and the data from the second sensor to compute a count value indicating how many objects are present in the area at the given point in time.

21. The apparatus of claim 20, wherein the first sensor comprises a passive infrared (PIR) detector.

22. The apparatus of claim 20, wherein the area comprises a conference room.

23. The apparatus of claim 20, further comprising:
means for defining a first overlay mask for the first sensor, wherein the first sensor is configured to exclude detecting objects in the area that are inside of the first overlay mask; and
means for defining a second overlay mask for the second sensor, wherein the second sensor is configured to exclude detecting objects in the area that are inside of the second overlay mask.

24. The apparatus of claim 20, further comprising:
means for mapping, based on a first timestamp received from the first sensor, the location of the first object in the area at the given point in time to a first virtual location associated with a virtual sensor;
means for mapping, based on a second timestamp received from the second sensor, the location of the second object in the area at the given point in time to a second virtual location associated with the virtual sensor;
means for determining that the first timestamp is within a threshold amount of the second timestamp;
means for determining that a distance between the first virtual location and the second virtual location is less than a threshold value; and
means for excluding the first object or the second object from the count value in response to determining that the distance between the first virtual location and the second virtual location is less than the threshold value.

* * * * *